United States Patent
Lim et al.

(10) Patent No.: US 6,333,952 B1
(45) Date of Patent: Dec. 25, 2001

(54) DECODER FOR DIGITAL TV RECEIVER

(75) Inventors: Il-Taek Lim; Cheol-Hong Min; Sang-Hee Cho; Seung-Jai Min, all of Seoul; Seong-Ok Bae, Kyonggi-do; Kyoung-Won Lim, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/301,762

(22) Filed: Apr. 29, 1999

(30) Foreign Application Priority Data

Apr. 29, 1998 (KR) ................................................ 98-15324
Apr. 29, 1998 (KR) ................................................ 98-15325

(51) Int. Cl.$^7$ ................................................. H04B 1/66
(52) U.S. Cl. .................... 375/240.27; 382/232; 382/239; 382/240
(58) Field of Search ..................................... 348/416, 392, 348/443, 397, 391, 458, 402, 448, 565, 566, 567, 423, 424, 555, 556, 445; 375/240.27; 382/232, 239, 240

(56) References Cited

U.S. PATENT DOCUMENTS 5,646,686 * 7/1997 Pearlstein ............................. 348/392
5,825,424 * 10/1998 Canfield et al. ..................... 348/416
6,061,400 * 5/2000 Pearlstein et al. .................... 375/240

FOREIGN PATENT DOCUMENTS 0862334  2/1998  (EP) .
2334644  8/1999  (GB) .

* cited by examiner

Primary Examiner—Chris Kelley
Assistant Examiner—Shawn S. An

(57) ABSTRACT

A decoder for a digital TV receiver is disclosed. The present decoder improves the picture quality of a video signal down converted when an SD class TV receiver receives an HD class video signal. Generally, the decoder receives data in block units, converts a format of the data into a format for display, memorizes the data, processes the memorized data, and displays the processed data by converting the format to include more horizontal color signals than vertical color signals, memorizing and reproducing the data in downsampling the data in block units in a given ratio, and storing the data.

8 Claims, 13 Drawing Sheets

FIG.1A
background art

4:4:4 Y/C format

4:2:2 Y/C format

4:2:0 Y/C formats

× × × × × × × ×
○ ○ ○ ○ ○ ○ ○ ○
× × × × × × × ×

× × × × × × × ×
 ○   ○   ○   ○
× × × × × × × ×

× × × × × × × ×
○   ○   ○   ○
× × × × × × × ×

× × × × × × × ×
 ○   ○   ○   ○
× × × × × × × × backgroud art

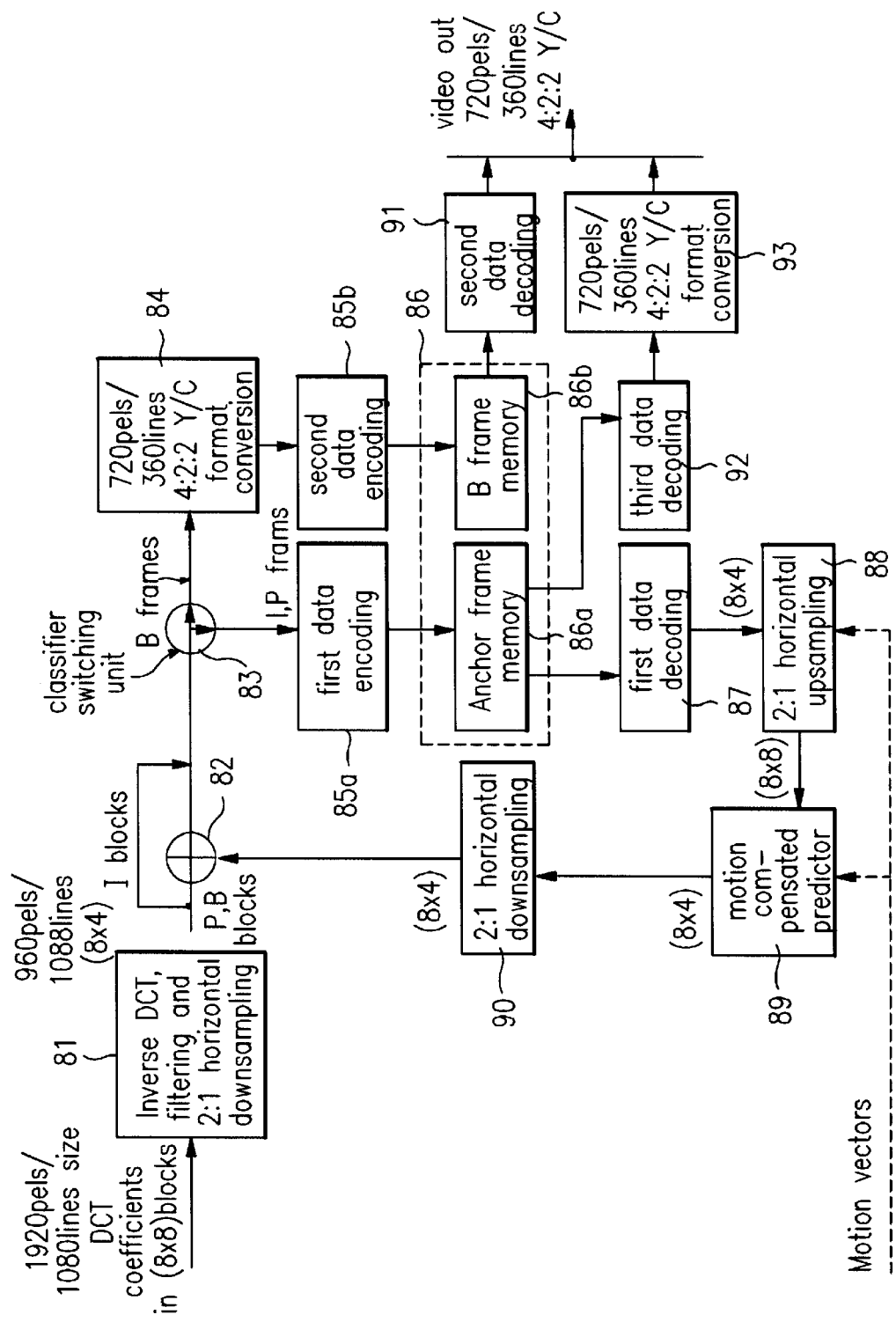

FIG.13A fourth and Fifth embodiments

| | Monitor | 16:9 wide TV | 4:3 TV (letter-box) |
|---|---|---|---|
| | | 4:3 TV (pan&scan) | |
| B frames | Y/C format | 4:2:2 | 4:2:2 |
| | Y pels | 720x480 | 720x360 |
| | Cb, Cr pels | 360x480x2 | 360x360x2 |
| | Total pels | 691,200 | 518,400 |
| I or P frames | Y pels | 960x1088 | |
| | Cb, Cr pels | 480x544x2(4:2:0 format) | |
| | Total pels | 1,566,720 | |
| I+P+B Total pels | | 3,824,640 | 3,651,840 |
| I+P+B Total KBytes (7 bits per pel) | | 3,268 | 3,120 |

FIG.13B

Prior Arts

| | Monitor | 16:9 wide TV | 4:3 TV (letter-box) |
|---|---|---|---|
| | | 4:3 TV (pan&scan) | |
| B frames | Y/C format | 4:2:0 | 4:2:0 |
| | Y pels | 720x480 | 720x360 |
| | Cb, Cr pels | 360x240x2 | 360x180x2 |
| | Total pels | 518,400 | 388,800 |
| I or P frames | Y pels | 960x1088 | |
| | Cb, Cr pels | 480x544x2(4:2:0 format) | |
| | Total pels | 1,566,720 | |
| I+P+B Total pels | | 3,651,840 | 3,522,240 |
| I+P+B Total KBytes (7 bits per pel) | | 3,120 | 3,010 |

DECODER FOR DIGITAL TV RECEIVER

BACKGROUND OF THE INVENTION

1. Field of the Invention

The present invention relates to a decoder for a digital TV receiver and more particularly for a digital TV to improve the picture quality of a video when a Standard Definition class TV receiver receives a High Definition class video signal.

2. Background of the Related Art

Generally, a digital TV receiver receives and decodes a video signal compressed in the MPEG2 format at a decoder to display the video on a screen. Depending upon the number of picture elements (pels) in relation to the resolution and image reproductivity or picture quality, a digital TV supports two classes of video signals, namely the High Definition TV (HDTV) and the Standard Definition TV (SDTV). The HDTV class video signal has a maximum capability of 1920 pels/1080 lines and the SDTV class video has a capability of 704 pels/480 lines. For purposes of explanation, the capability will be limited to a HDTV class signal of 1920 pels/1080 lines and a SDTV class signal of 720 pels/480 lines.

A conventional decoder for a digital TV receiver will be explained with reference to the figures. A widely used format is a ratio of three components of luminance information Y and chrominance information Cb and Cr in a horizontal (or scanning) line on a TV screen or the like, represented as 0:0:0. FIG. 1A shows a 4:4:4 video format, FIG. 1B shows a 4:2:2 video format, and FIG. 1C shows a 4:2:0 video format. In the figures, the cross represents a luminance signal Y and the circle represents a chrominance signal Cb or Cr.

Particularly, the luminance indicates the extent of brightness of an image and the luminance of a pel is represented with 8 bits according to the ITU-R BT.601 recommendation. The chrominance or color difference is the information on a color of an image and is also represented by 8 bits according to the ITU-R BT.601 recommendation. Thus, a total of 24 bits are assigned to one pel. However, because the human eye is not very sensitive to the small variations in color, some color information is frequently left out in the representation of the video.

Particularly, FIG. 1A shows the video format 4:4:4 in which no color information is left out. FIG. 1B shows the video format 4:2:2 in which half of the color information in a horizontal direction is left out. FIG. 1C shows the video format 4:2:0 in which half of the color information in both the horizontal and vertical direction is left out. Namely, the 4:2:2 format has color information which is half of luminance information, and the 4:2:0 format has color information which is quarter of luminance information.

In a digital TV receiver, one digital pel is typically expressed by 8 bits and every macro block has 16×16 pel data. The decoder processes a bit stream corresponding to each class inclusive of Discrete Cosine Transform (DCT) coefficients and motion vector information. FIG. 2 shows a block diagram of a conventional decoder for a digital TV receiver including a Variable Length Decoder (VLD) 1 for variable length decoding of a received bit stream data to provide DCT coefficients and motion vectors; an Inverse DCT (IDCT) 2 for inverse discrete cosine transforming the DCT coefficients to decode the DCT coefficients into spatial pel values; an adder 3 for adding data motion compensated at a motion compensated predictor 4 to the decoded data, to restore a video data; a frame memory 5 for storing the restored video data in a 4:2:0 video format; and an upsampling unit 6 for upsampling the data stored in the frame memory 5 into a 4:2:2 video format to output the video to a display unit. The motion compensated predictor 4 compensates the video data stored in the frame memory 5 using the motion vectors from the VLD 1, and forwards the compensated data to the adder 3.

Having a capability to receive and decode a HD class video data, a HD class digital TV receiver has no problems receiving and decoding a SD class video data. However, a SD class digital TV which is adapted to receive and decode a SD class video data cannot receive and decode a HD class video data. Nevertheless, in order to achieve full compatibility, the SD class digital TV receiver should also have the capability to receive and process the HD class video class. Thus, a decoder for the SD class digital TV receiver has been adapted to carry out a SD class data processing on a HD class data by a process known as down-converting, which is essentially a down sampling or filtering/decimation.

FIG. 3 shows one example of a decoder in the related art for a SD class TV receiver to carry out the down-converting process by receiving, decoding and displaying a HD class data. In FIG. 3, an 8×8 block data is decoded by reducing the data into a 4×4 block data. An 8×8 block data 41 is inverse discrete cosine transformed and downsampled in the horizontal and vertical directions at an IDCT/down-sampling unit 42 for 8 pels to reduce the 8×8 block into a 4×4 block. Particularly, 16 coefficients, indicated as black dots in the data block 41, are selected from the upper left hand corner and subjected to the IDCT to obtain a down-sampled video data. The remaining coefficients, indicated as white dots are discarded. There are numerous other ways in selecting the coefficients.

In FIG. 3, the 4×4 down sampled video data is added to the motion compensated data at an adder 43 and stored in a frame memory 44 (or field memory). In order to process motion vectors corresponding to the down-sampled video data, the video data in the frame memory 44 is upsampled in horizontal/vertical directions at an upsampling unit 45 to an 8×8 data. The upsampled video data is motion compensated by the motion vectors at a motion compensated predictor 46, downsampled in horizontal/vertical directions at a downsampling unit 47 back to a 4×4 data, and added to the adder 43 to obtain a video block downsampled from 8×8 data to 4×4 data. The downsampled video data in finally stored in the frame memory. To present the data, the data from the frame memory 44 is converted into the 4:2:0 format at a format converter 48 and converted into the 4:2:2 format at an upsampling unit 49 before presentation.

FIG. 4 shows another example of a decoder in the related art for a SD class TV receiver to carry out the down-converting process by receiving, decoding and displaying a HD class data. In FIG. 4, an 8×8 block data is decoded by reducing the data into an 8×4 block data. An 8×8 block data 51 is inverse discrete cosine transformed and downsampled in the horizontal and vertical directions at an IDCT/downsampling unit 52 for 8 pels to reduce the 8×8 block into a 8×4 block. Similarly to FIG. 3, after selecting 32 coefficients from the left hand side, indicated as black dots in the data block 41, the remaining coefficients, indicated as white dots are discarded. There are also numerous other ways in selecting the coefficients.

In FIG. 4, the 8×4 down sampled video data is added to the motion compensated data at an adder 53 and stored in a frame memory 54 (or field memory). In order to process motion vectors corresponding to the down-sampled video data, the video data in the frame memory 54 is upsampled in horizontal/vertical directions at an upsampling unit 55 to an 8×8 data. The upsampled video data is motion compensated by the motion vectors at a motion compensated predictor 56, downsampled in horizontal/vertical directions at a downsampling unit 57 back to an 8×4 data, and added to the adder 53 to obtain a video block downsampled from 8×8 data to 8×4 data. The downsampled video data in finally stored in the frame memory. To present the data, the data from the frame memory 54 is converted into the 4:2:0 format at a format converter 58 and converted into the 4:2:2 format at an upsampling unit 59 before presentation.

FIG. 5 shows yet another example of a decoder in the related art for an SD class TV receiver to carry out the down-converting process by receiving, decoding and displaying a HD class data. FIG. 6 explains an encoding/decoding method for receiving, decoding and displaying a HD class data at an SD class TV receiver.

The intra (I), predicted (P) and bi-directional (B) pictures are downsampled to an 8×4 block. The downsampled B picture is converted into a 720 pels/480 lines through a format conversion and encoding before being stored in a memory. The downsampled I and P pictures are first decoded and also converted into a 720 pels/480 lines through a format conversion. The decoded I and P picture data are presented together with the decoded B picture data.

In FIG. 5, an IDCT/downsampling unit 61 inverse discrete cosine transforms and filters/downsamples the received DCT coefficients to convert from 8×8 to 8×4 blocks. The downsampling is performed for all I, P and B pictures, and the downsampled 8×4 data is forwarded to an adder 62. The adder 62 adds the downsampled data to a motion compensated data, and a classifier 63 classifies the data from the adder 62 into I, P and B pictures. The B picture is converted into a 4:2:0 format through a format converting unit 64. A data reduction of the format converted B picture is performed by a data encoding unit 65b, and a memory 66b in a memory 66 stores the B picture. An exemplary bit reduction at the data encoding unit 65b is shown in FIG. 6 and may be applied to a data encoding unit 65a for the I and P pictures. Also, data decoding is a reverse operation of the data encoding.

Referring to FIG. 6, in consideration of a limited memory size, the number of bits is reduced utilizing a correlation between adjacent pels. For example, an 8×4 bits are reduced to 14 bits considering the correlation between adjacent pels in a horizontal (or vertical) direction. Particularly, the horizontal (or vertical) pels p1–p4 701 of the decoded image pels 700 having 16 bits per two horizontal (or vertical) pels are converted into p1 (original value), p2–p1 (a difference between adjacent pels), p3 and p4–p3 (a difference between adjacent pels) 702. Both the differences between adjacent pels p2–p1 and p4–p3 are represented with 9 bits due to a possibility of a negative sign.

Data of the converted pels p1, p2–p1, p3 and p4–p3 are coded using a non-uniform quantization table 703, wherein p1 is coded into an 8 bit value, p2–p1 is coded into a 6 bit value, p3 is coded into an 8 bit value, and p4–p3 is coded into a 6 bit value. The results of the coding 704 are stored in a memory 705, which may be an anchor frame memory 66a or the B frame memory 66b shown in FIG. 5. The data with the reduced bits is thus stored in the B frame memory 66b and may be decoded through a reverse process of the coding process discussed above at a first data decoding unit 71 to restore or reproduce an image.

Depending upon the classifier switching unit 63, a data reduction of the I or P picture may also be performed at an encoding unit 65a by a method discussed above in reference to FIG. 6 and the anchor frame memory 66a in the memory 66 would then store the data reduced I or P picture. Thereafter, the I or P picture would be decoded in a second and third data decoding units 67 and 72.

Particularly, the 8×4 data decoded at the second data decoding unit 67 is upsampled in the horizontal direction at a horizontal upsampling unit 68 which receives motion vectors to output an 8×8 data. The upsampled 8×8 data is output to a motion compensated predictor 69 for motion compensation using motion vector information, and forwarded to a horizontal downsampling unit 70 in an 8×8 size. The horizontal downsampling unit 70 downsamples the 8×8 motion compensated block in the horizontal direction into an 8×4 block and forwards the downsampled data to the adder 62, thereby providing motion compensated I, P and B picture signals in conformity with the 8×4 P and B pictures (sizes) downsampled by the IDCT/downsampling unit 61.

By repeating the aforementioned process, the I, P and B frame data are processed, wherein an 8×4 data of the I, P and B pictures output from the anchor frame memory 66a and decoded at the third data decoder 72 are converted into a 4:2:0 format at a format converting unit 73 (made to be in conformity with a B frame format). The converted 4:2:0 format data is further converted into a 4:2:2 format at the upsampling unit 74, and output as a final video signal together with the B picture information.

Nevertheless, the described decoder in the related art for an SD class TV receiver to receive, decode, and display an HD class data has problems. First, the storage of a video signal in a 4:2:0 format and upsampling the stored data into a 4:2:2 format due to the memory size does not take into consideration a human's visual sensation characteristic. Since our experiments show that a human is visually more sensitive to a color variation in a vertical direction than a horizontal direction, the decoder in the related art results in a color signal resolution which is too low relative to a luminance signal resolution.

That is, a SD class TV decoder in the related art for receiving, decoding, and displaying a HD class data converts a video data from a 4:4:4 format to a 4:2:0 format and stores the converted data in a memory considering only a memory size. In such case, portions of horizontal and vertical color signals are left out as the video signal is converted from a 4:4:4 format into 4:2:0 format. Accordingly, in the upsampling of the video signal from the 4:2:0 format to the 4:2:2 format or 4:4:4 format, the color signal which is upsampled is not the original color signal left out, but a color signal interpolated around the original selected color signal. Thus, an image reproduced from the converted video signal in the related art results in deterioration of a picture quality with respect to visual sensations.

Second, considering a memory size, the video signal is first converted into the 4:2:0 format before storage and re-converted into the 4:2:2 format before presentation. However, the conversion of the video signal into 4:2:0 format before an internal process results in the reduction of color informationion. Therefore, the conversion from the 4:2:0 format including less color signal to the 4:2:2 format may be a mere re-conversion of a video signal with less color signal, resulting also in a deterioration of picture quality.

SUMMARY OF THE INVENTION

Accordingly, an object of the present invention is to solve at least the problems and disadvantages of the related art.

An object of the present invention is to provide a decoder for a digital TV receiver with an improved picture quality of a color signal with respect to the visual sensation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the decoder for a digital TV receives data in block units; converts a format of the data into a format for display; memorizes the data; processes the memorized data; and displays the processed data by carrying out the conversion of the format to include more vertical color signals than horizontal color signals; and memorizing and reproducing the data in downsampled data block units with a given ratio to store the data.

BRIEF DESCRIPTION OF THE DRAWINGS

The invention will be described in detail with reference to the following drawings in which like reference numerals refer to like elements wherein:

FIG. 1A shows a 4:4:4 video signal format in the related art;

FIG. 1B shows a 4:2:2 video signal format in the related art;

FIG. 1C shows a 4:2:0 video signal format in the related art;

FIG. 10 shows a video signal storage format according to the third embodiment of the present invention;

FIG. 11 is a block diagram of a decoder for a digital TV receiver according to a fourth embodiment of the present invention;

FIGS. 13A and B are tables comparing the fourth and fifth embodiments according to the present invention to the related arts.

DETAILED DESCRIPTION OF THE PREFERRED EMBODIMENT

The different embodiments of a decoder for a digital TV receiver according to the present invention will be explained below with reference to the figures. Essentially, the present invention takes into consideration both the limitations of the memory size and the visual sensations characteristics, thereby improving the video quality for a viewer.

First Embodiment

Figure 7:
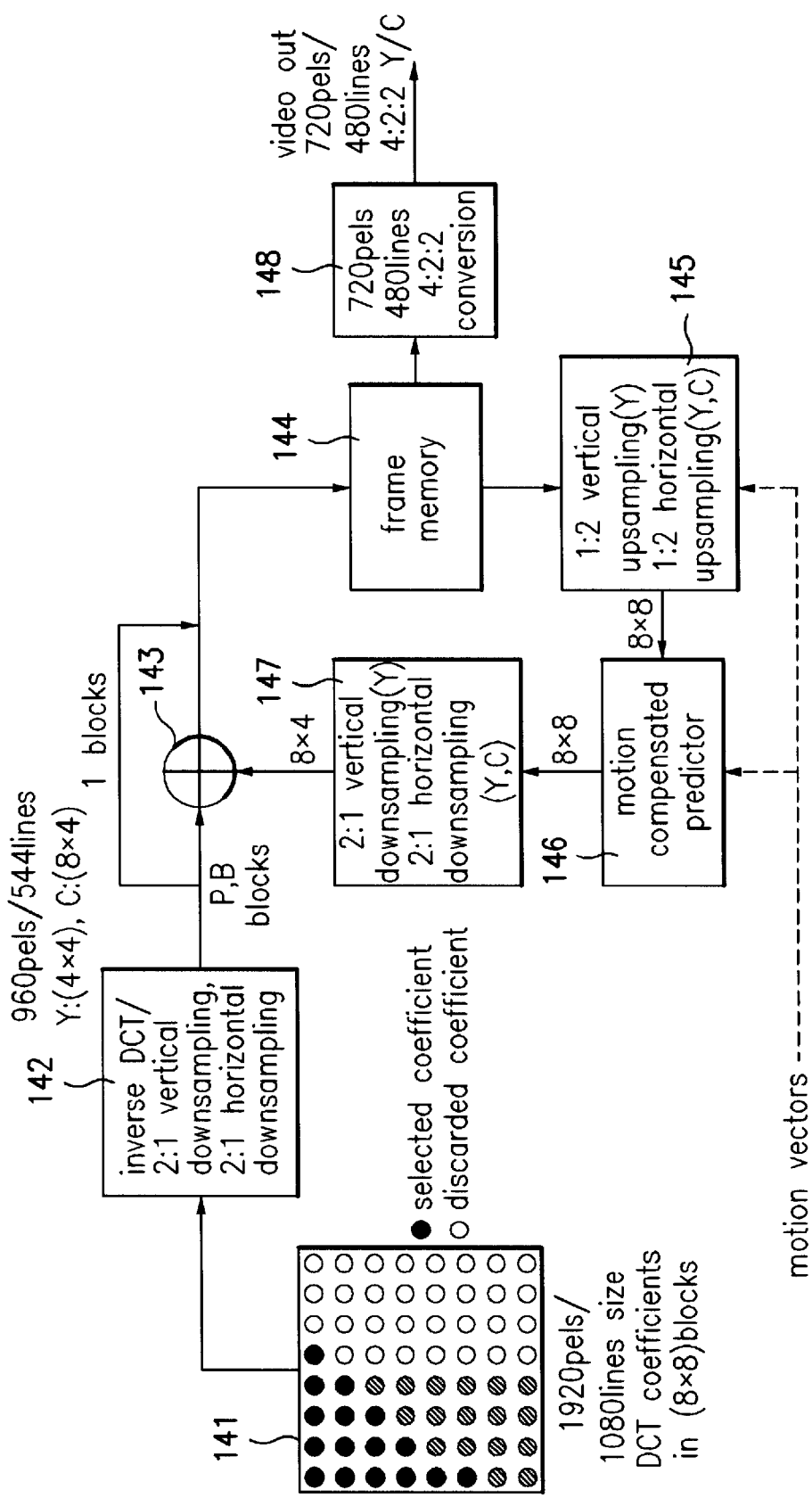
FIG. 7 is a block diagram of a decoder for a digital TV receiver according to a first embodiment of the present invention.

A decoder for a digital TV receiver according to the first embodiment of the present invention receives a block data of 8×8 size, downsamples the luminance information into a size of 4×4 and the color information into a size of 8×4 before storage in a memory, and converts the downsampled data into a 4:2:2 format with a size of 720 pels/480 lines or 720 pels/360 lines before final presentation. FIG. 7 is a block diagram of a decoder for a digital TV receiver according to the first embodiment of the present invention.

Referring to FIG. 7, the decoder for a digital TV receiver includes an IDCT/downsampling unit 142 inverse discrete cosine transforming and downsampling the luminance information in a 8×8 data block 141 for 8 pels in the horizontal and vertical directions into a luminance data of 4×4 size, and inverse discrete cosine transforming and downsampling the color information in the horizontal direction into a color data of 8×4 size; an adder 143 adding a sampled data from the IDCT/downsampling unit 142 to the motion compensation information; a frame memory 144 storing the data added by the adder 143; upsampling unit 145 upsampling the luminance information in the vertical and horizontal direction, and horizontally upsampling the color information of the data stored in the frame memory 144 to provide an 8×8 data; a motion compensated predictor 146 motion compensating the video data upsampled by the upsampling unit 145 using motion vectors; a downsampling unit 147 vertically and horizontally downsampling the luminance information of the information compensated by the motion compensated predictor 146 to a 4×4 size, horizontally downsampling the color information to an 8×4 size, and outputting the downsampled information to the adder 143; and a format conversion unit 148 converting the output of the frame memory 144 to a 4:2:2 format of a size 720 pels/480 lines or 720 pels/360 lines to present the video. The operation of the decoder in FIG. 7 will be explained below.

The luminance information in an 8×8 size data block 141 is inverse discrete cosine transformed and downsampled for 8 pels in the horizontal and vertical directions into a 4×4 size data block. The color information of the data block, however, is inverse discrete cosine transformed and downsampled for 8 pels in a horizontal direction into an 8×4 size data block. The video data having luminance information and color information downsampled into 4×4 and 8×4 respectively is added to the motion compensated data at the adder 143 and stored in the frame memory 144.

To process the video data stored in the frame memory 144 using the motion vectors, the luminance information in the video data stored in the frame memory is upsampled in the vertical and horizontal direction and the color signal is upsampled in the horizontal direction by the upsampling unit 145 into an 8×8 size data. Accordingly, the upsampled 8×8 size data is motion compensated at the motion compensation predictor 146 by the motion vectors. Having a size of 8×8, the luminance information of the compensated information is downsampled back into a 4×4 size and the color information is downsampled back into an 8×4 size at the downsampling unit 147. The downsampled compensated information is added at the adder 143, thereby obtaining a downsampled video block to store in the frame memory 144.

For presentation, the output of the frame memory 144 is converted into a 4:2:2 format with a size of 720 pels/480 lines or 720 pels/360 lines at the format conversion unit 148. Assuming that we have a 16:9 image source, the size of 720 pels/480 lines is for a wide TV display or a pan and scan type display on a 4:3 TV, and the size of 720 pels/360 lines is for a letter-box type display on a 4:3 size TV.

Second Embodiment

Figure 8:
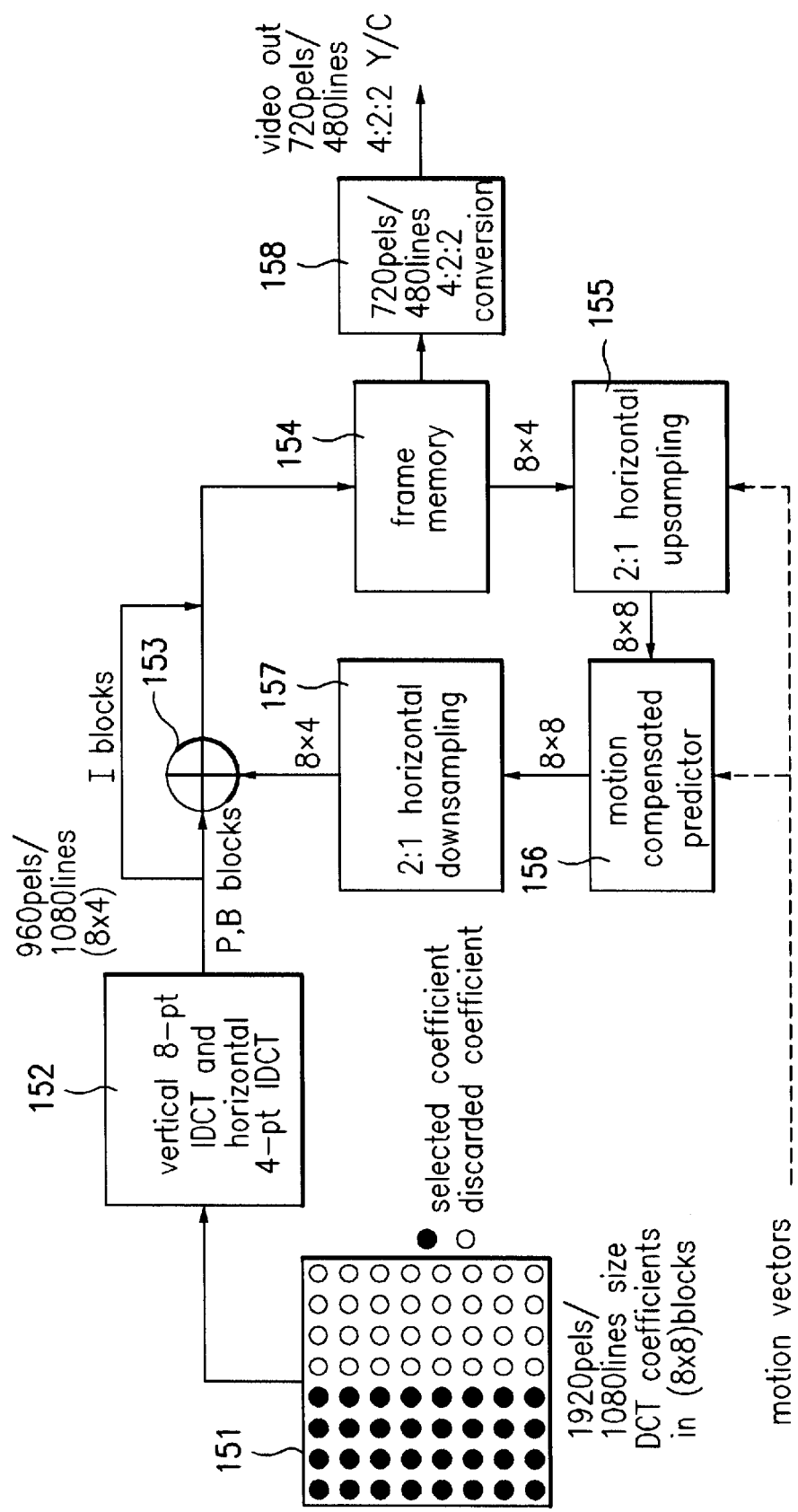
FIG. 8 is a block diagram of a decoder for a digital TV receiver according to a second embodiment of the present invention.

A decoder for a digital TV receiver according to the second embodiment of the present invention receives a block data of 8×8 size, downsamples the luminance information and the color information into a size of 8×4 before storage in a memory, and converts the downsampled data into a 4:2:2 format with a size of 720 pels/480 lines or 720 pels/360 lines before final presentation. FIG. 8 is a block diagram of a decoder for a digital TV receiver according to the first embodiment of the present invention.

Referring to FIG. 8, the decoder for a digital TV receiver includes an IDCT/downsampling unit 152 inverse discrete cosine transforming and horizontally downsampling the luminance information and the color information in a 8×8 data block 151 for 8 pels into a color data of 8×4 size; an adder 153 adding a sampled data from the IDCT/downsampling unit 152 to the motion compensation information; a frame memory 154 storing the data added by the adder 153; upsampling unit 155 horizontally upsampling the luminance and color information of the data stored in the frame memory 154 to provide an 8×8 data; a motion compensated predictor 156 motion compensating the video data upsampled by the upsampling unit 155 using motion vectors; a downsampling unit 157 horizontally downsampling the luminance and color information of the information compensated by the motion compensated predictor 156 to an 8×4 size, and outputting the downsampled information to the adder 153; and a format conversion unit 158 converting the output of the frame memory 154 to a 4:2:2 format of a size 720 pels/480 lines or 720 pels/360 lines to present the video. The operation of the decoder in FIG. 8 will be explained below.

The luminance and color information in an 8×8 size data block 151 is inverse discrete cosine transformed and downsampled for 8 pels in the horizontal directions into an 8×4 size data block. The video data having luminance and color information downsampled into 8×4 is added to the motion compensated data at the adder 153 and stored in the frame memory 154.

To process the video data stored in the frame memory 154 using the motion vectors, the luminance and color information in the video data stored in the frame memory is upsampled in the horizontal direction by the upsampling unit 155 into an 8×8 size data. Accordingly, the upsampled 8×8 size data is motion compensated at the motion compensation predictor 156 by the motion vectors. Having a size of 8×8, the compensated information is downsampled back into an 8×4 size at the downsampling unit 157. The downsampled compensated information is added at the adder 153, thereby obtaining a downsampled video block to store in the frame memory 154.

For presentation, the output of the frame memory 154 is converted into a 4:2:2 format with a size of 720 pels/480 lines or 720 pels/360 lines at the format conversion unit 158. As discussed above, for a 16:9 source, the size of 720 pels/480 lines is for a wide TV display or a pan and scan type display on a 4:3 TV, and the size of 720 pels/360 lines is for a letter-box type display on a 4:3 size TV.

Third Embodiment

A decoder for a digital TV receiver according to the third embodiment of the present invention downsamples the I, P and B pictures into a data block of 8×4 size. The B picture is converted and encoded into a modified 4:2:0 format of a size 720 pels/480 lines defined to maintain consistency with the total data amount of an existing 4:2:0 format but to include vertical video information relatively greater than horizontal video information. Namely, the B picture is converted into a 4:2:0 format in which no vertical color signal is left out while horizontal color signals are left out, and stored in a memory. The I and P pictures are directly encoded and stored in the memory as an anchor frame. Thereafter, the B picture is decoded, and the I, P pictures are data decoded and converted into the modified 4:2:0 format of a size 720 pels/480 line equivalent to the B picture. Thus, the decoded I and P pictures are presented together with the decoded B picture. The downsampling ratio and number of pels suggested in this embodiment are exemplary, and are not limited to these values.

Figure 9:
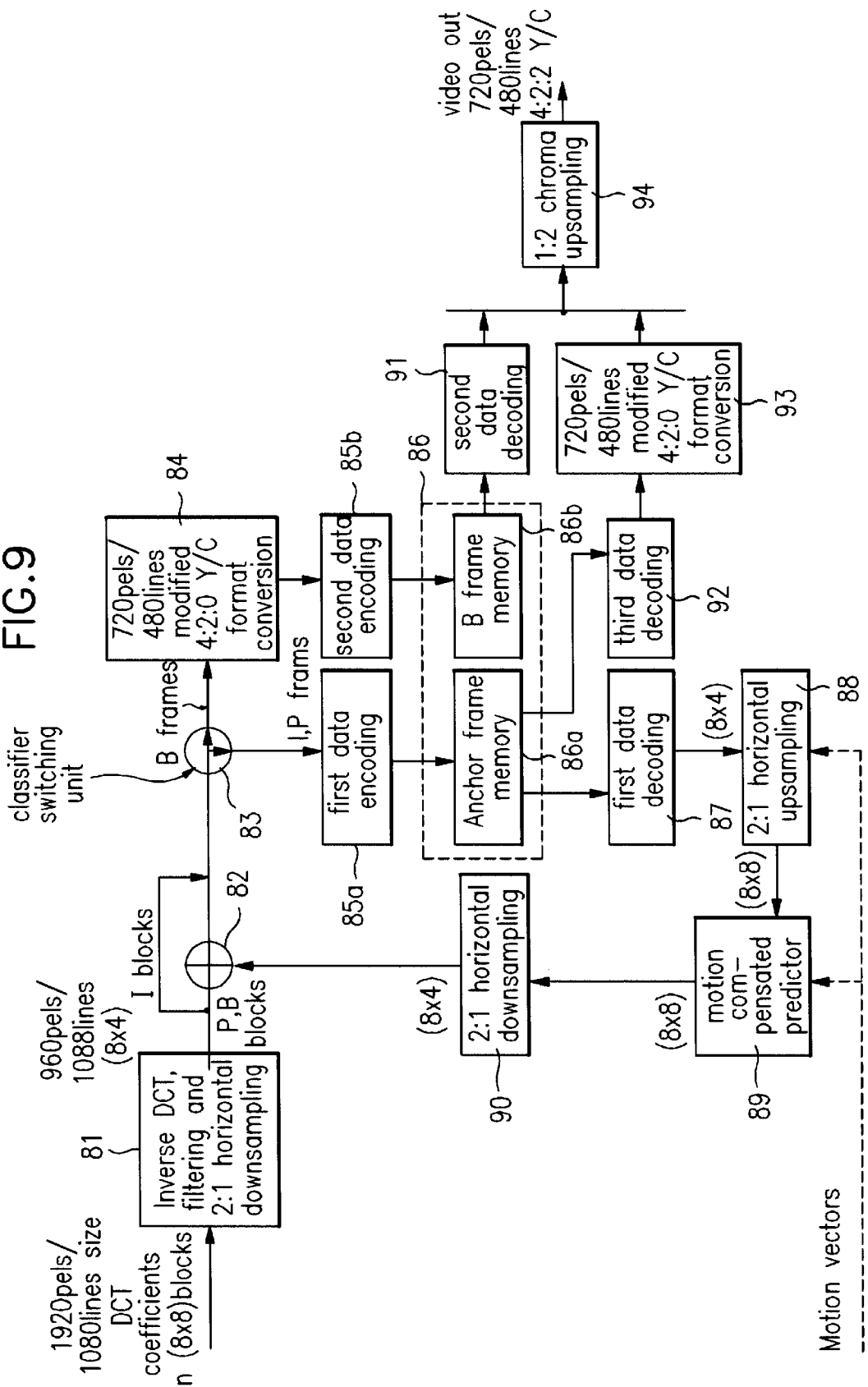
FIG. 9 is a block diagram of a decoder for a digital TV receiver according to a third embodiment of the present invention.

FIG. 9 is a block diagram of a decoder for a digital TV receiver according to the first embodiment of the present invention and FIG. 10 explains a video signal storage format according to the third embodiment of the present invention.

In FIG. 9, the decoder includes an IDCT/downsampling unit 81 inverse discrete cosine transforming and filter/downsampling the received DCT coefficients to reduce from an 8×8 (inclusive of I, P and B pictures) to an 8×4 block; an adder 82 adding the 8×4 downsampled data to a motion compensated data; a classifier 83 classifying and separating the data from the adder 82 into I, P and B pictures; a format converting unit 84 converting the B picture of the 8×4 data from the classifier 83 into a modified 4:2:0 format in which more vertical color signal information is included than horizontal color signal information; a first and second data encoding unit 85a and 85b encoding the I and P pictures from the classifier 83 and the B picture from the format conversion unit 84 respectively; a memory 86 including an anchor frame memory 86a storing the I, P picture information encoded by the first and second data encoding units 85a and 85b, and a B frame memory 86b storing the B picture information.

The decoder in FIG. 9 further includes a first data decoding unit 87 decoding the data stored in the anchor frame memory 86a; a horizontal upsampling unit 88 horizontally upsampling the information decoded by the first data decoding unit 87 to convert into a 8×8 size; a motion compensated predictor 89 receiving an output of the horizontal upsampling unit 88 and performing both motion compensation and prediction using the motion vector information; a horizontal downsampling unit 90 for horizontally downsampling and forwarding the output of the motion compensation predictor 89 into an 8×4 size to the adder 82; a second data decoding unit 91 decoding the data stored in the B frame memory 86b to provide B frame information; a third data decoding unit 92 decoding the data stored in the anchor frame memory 86a; a format conversion unit 93 converting a format output from the third data decoding unit 92 to include relatively more color information in the vertical direction than in the horizontal direction for matching the output of the third decoding unit 92 to the format conversion unit 84; and an upsampling unit 94 converting the output of the second decoding unit 91 and the output of the format conversion unit 93 into 4:2:2 formats, thereby presenting a video signal.

The operation of the decoder for a digital TV receiver in accordance with a third embodiment of the present invention will be explained. The IDCT/downsampling unit 81 receives DCT coefficients in an 8×8 size input data (inclusive of I, P and B pictures). The IDCT/downsampling unit 81 inverse discrete cosine transforms and horizontally downsamples the received coefficients to reduce from the 8×8 size to an 8×4 size, and forwards the data to the adder 82. The adder 82 adds the 8×4 data and the motion compensation information, and the classifier 83 separates the B picture from the I and P pictures in the 8×4 data. The first format converting unit 84 converts the B picture of the 8×4 data from the classifier 83 into a modified 4:2:0 format of a size 720 pels/480 lines such that more vertical color signal information is relatively included than the horizontal color signal information.

Particularly, the B picture of the 8×4 format is converted, not into the 4:2:0 format as in the related art shown in FIG. 10A, but into the modified 4:2:0 format of a size 720 pels/480 lines as shown in FIG. 10B which relatively includes more vertical color signal information than the horizontal color signal information. The modified 4:2:0 format shown in FIG. 10B can be explained using FIG. 1. Referring back to FIG. 1, if every second of the color signal information is deducted from the 4:4:4 format in a horizontal direction, the 4:4:4 format of FIG. 1A becomes the 4:2:2 format of FIG. 1B. Furthermore, if every second of the color signal information is deducted from the 4:2:2 format in a horizontal direction, the 4:2:2 format of FIG. 1B becomes the modified 4:2:2 format of FIG. 10B.

The total amounts of data in the existing 4:2:0 format of FIG. 10A and the modified 4:2:0 format of FIG. 10B are equivalent. However, the modified 4:2:0 format increases the resolution in the vertical direction which experimentally has a greater influence on the visual sensation while reducing the resolution in the horizontal direction. In FIG. 10A and 10B, the cross symbol represents the luminance signals and the circle symbol represents color signals (Cb or Cr). Namely, four color signals are arranged in the horizontal direction in the related art, while two color signals are arranged in the horizontal direction in the present invention. Also, four color signals are arranged in the vertical direction in the related art, while eight color signals are arranged in the vertical direction in the present invention. Therefore, in comparison to the related art, even though there is no change in the total amount of data, the modified 4:2:0 format has a greater amount of information in the vertical direction than in the horizontal direction.

Figure 2:
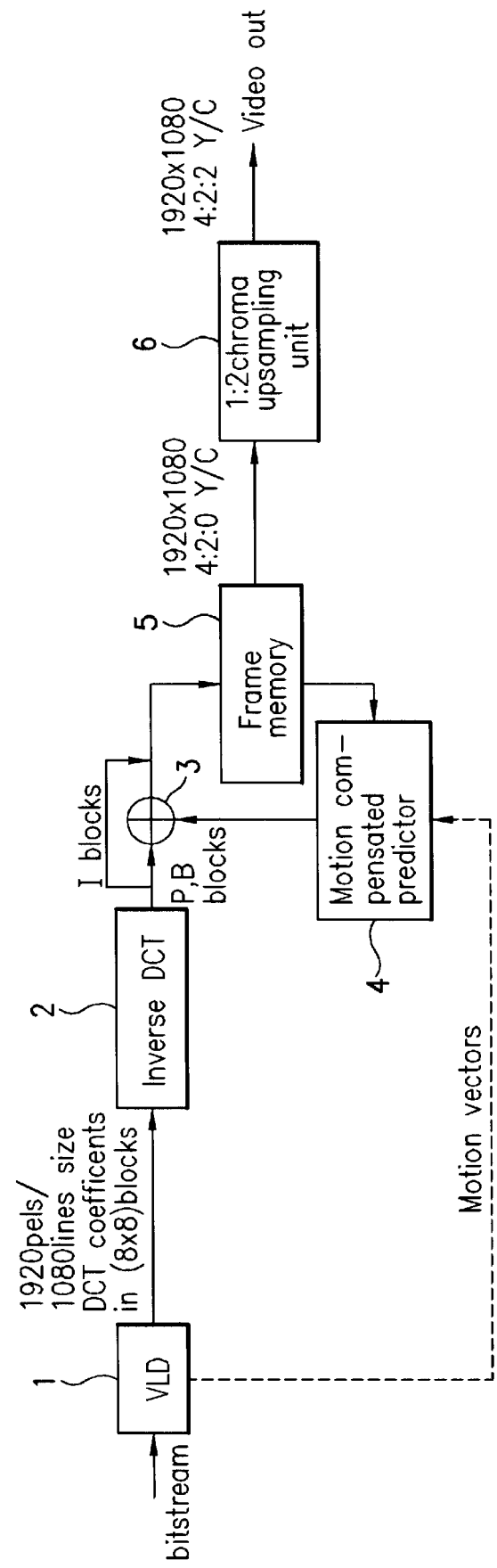
FIG. 2 is a block diagram of a decoder for a digital TV receiver in the related art.
Figure 3:
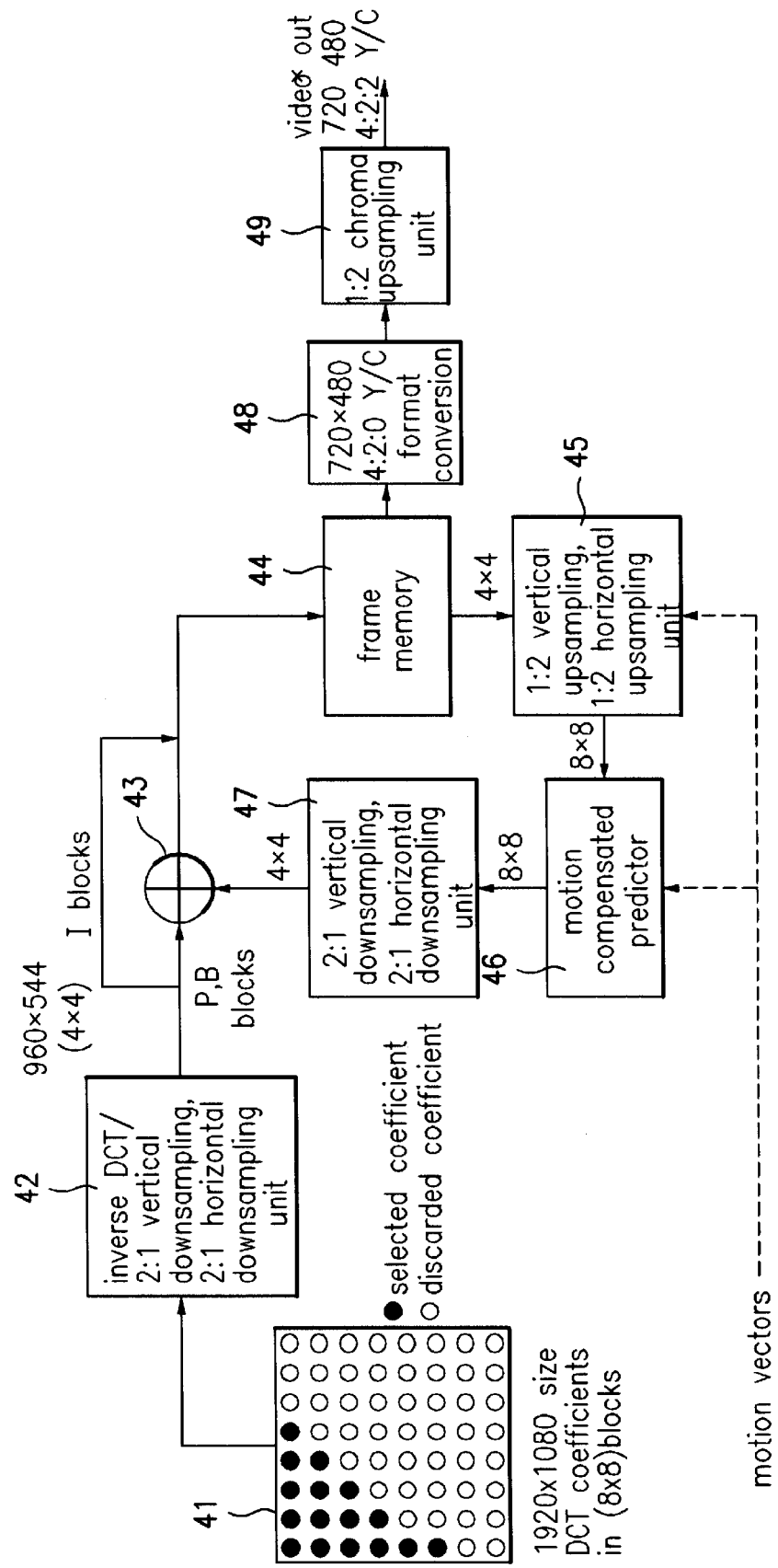
FIG. 3 is a block diagram showing one example of a decoder for downsampling in an SD class TV receiver to receive, decode and display an HD class data.
Figure 4:
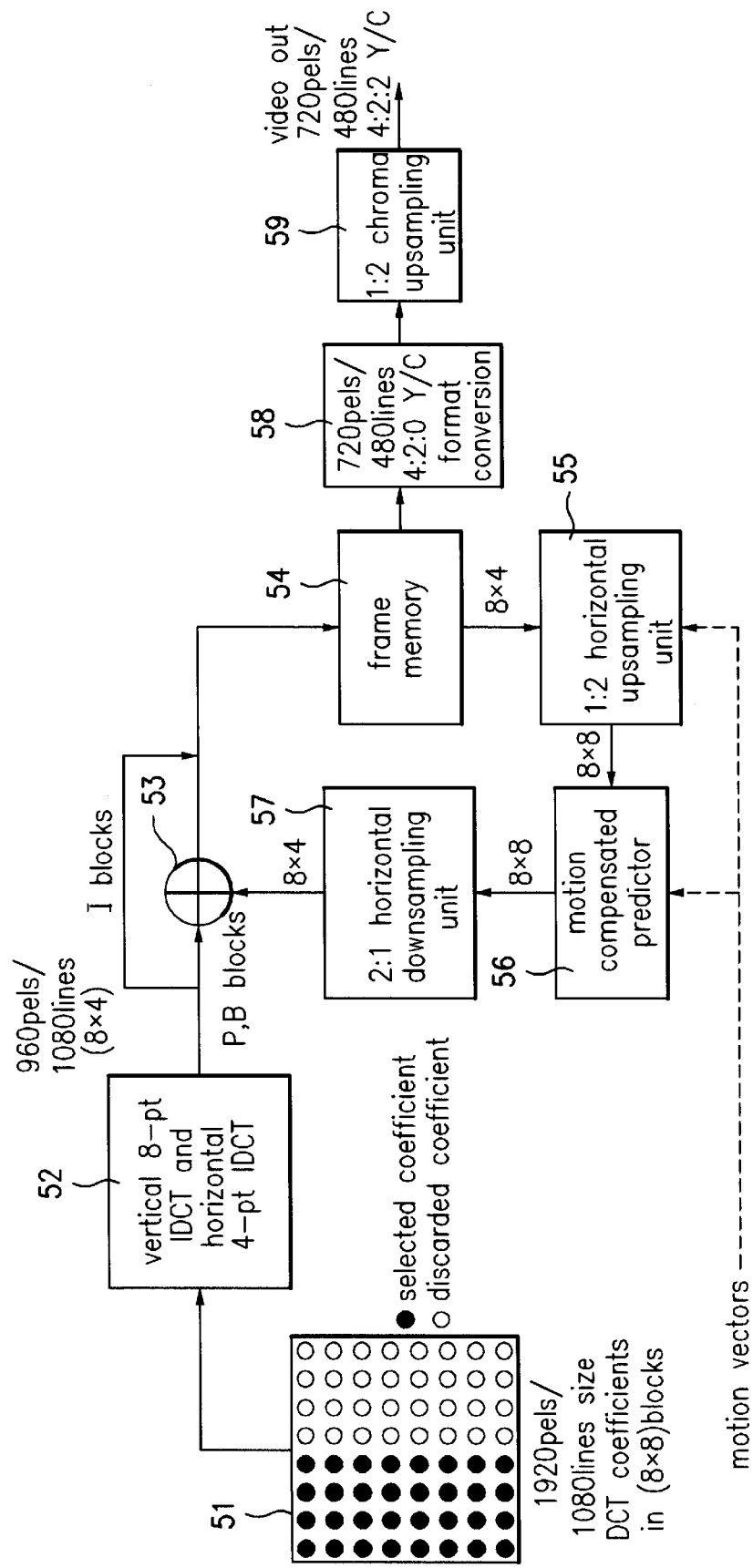
FIG. 4 is a block diagram showing another example of a decoder for downsampling in an SD class TV receiver to receive, decode and display an HD class data.
Figure 5:
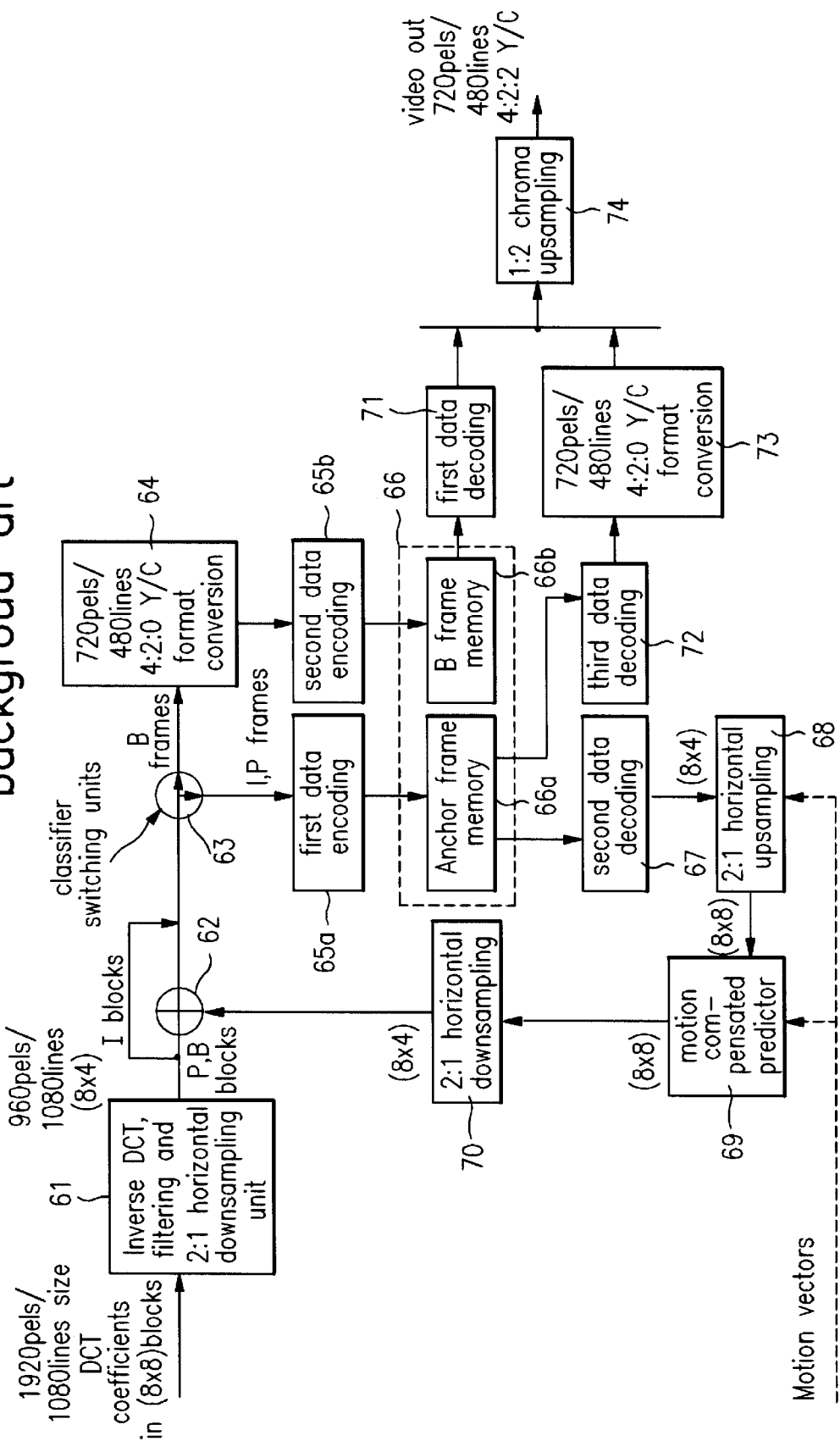
FIG. 5 is a block diagram showing another example of a decoder for downsampling in an SD class TV receiver to receive, decode and display an HD class data.
Figure 6:
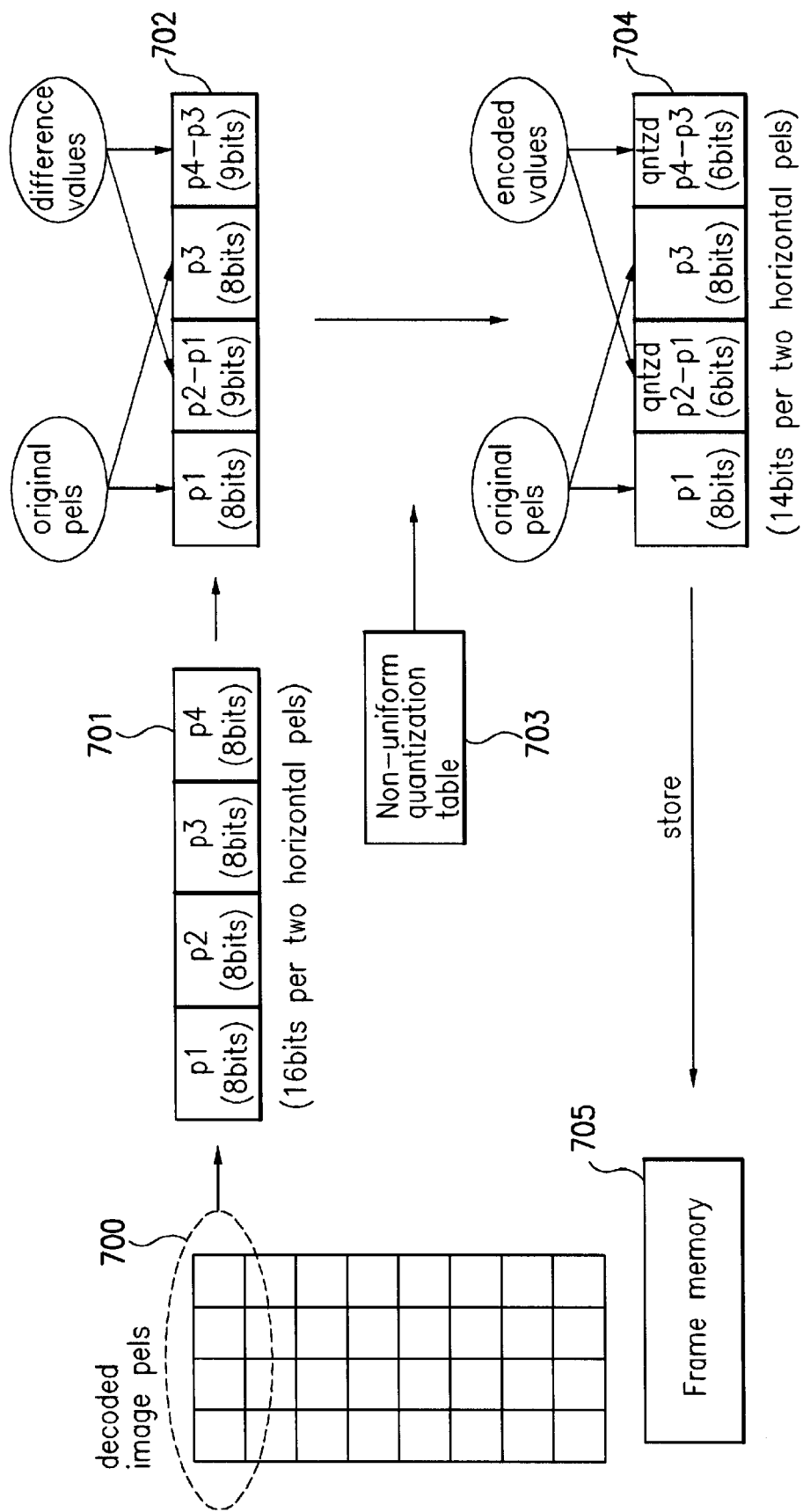
FIG. 6 shows an encoding/decoding method in the related art for receiving, decoding, and displaying an HD class data at an SD class TV receiver.

The bits of the B picture converted into the modified 4:2:0 format at the format conversion unit 84 are reduced at the second data encoding unit 85b and stored in the B frame memory 86b in the memory 86. The bits of the I, P frames classified at the classifier 83 are also reduced through the first data encoding unit 85a and stored in the anchor frame memory 86a. The bit reduction at the first and second encoding units 85a and 85b are may be carried out in the same method as explained with reference to FIG. 6.

Thereafter, the data from the anchor frame memory 86a is decoded at the first data decoding unit 87, and the decoded 8×4 data is horizontally upsampled at the horizontal upsampling unit 88 which receives motion vectors for motion compensation. The 8×8 data horizontally upsampled at the horizontal upsampling unit 88 is output to the motion compensated predictor 89 to be motion compensated by the motion compensation vectors. Having a size of 8×8, the compensated data is forwarded to the horizontal sampling unit 90 and horizontally downsampled into 8×4 before being forwarded to the adder 82, thereby providing motion compensated I, P and B picture signals in conformity with the I, P and B picture data(sizes) downsampled by the IDCT/downsampling unit 81.

By repeating the above procedures, the I, P and B frame data are processed. The B picture data from the B frame memory 86 is decoded by the second data decoding unit 91, and the I and P picture data from the anchor frame memory 86a are decoded at the third data decoding unit 92. The 8×4 data decoded at the third data decoding unit 92 is converted into the modified 4:2:0 format of the size of 720 pels/480 lines, which would be equivalent to the B frame format, through the second format conversion unit 93. The data from the second and third data decoding units 91 and 93 are converted into final display sizes at the upsampling unit 94 to display the video.

Fourth Embodiment

A decoder for a digital TV receiver according to the fourth embodiment of the present invention downsamples the I, P and B pictures into a data block of 8×4 size. The B picture is converted into a 4:2:2 format, which is the final display format, and stored in a memory. Thus, the B picture is in conformity with the final display format at the initial downsampling process. The format retains sufficient amount of color information eliminating the necessity of a further upsampling process for upsampling a 4:2:0 format into a 4:2:2 format. In the fourth embodiment, upon conversion into a 4:2:2 format, the total amounts of data are the same compared to the third embodiment because the fourth embodiment deals only with 30 lines, but alike the third embodiment while the vertical color signal information is relatively greater than the horizontal color signal information.

FIG. 11 is a block diagram of a decoder for a digital TV receiver according to the fourth embodiment of the present invention. For purpose of explanation, the digital TV receiver will be assumed to have an aspect ratio 4:3 but displays in an aspect ratio of 16:9 source aspect ratio by inserting black spaces at the top and bottom of an image which is outside the area of 720 pels/360 lines, called a letter-box type display.

In FIG. 11, the decoder includes an IDCT/downsampling unit 81 inverse discrete cosine transforming and filter/downsampling the received DCT coefficients to reduce from an 8×8 (inclusive of I, P and B pictures) to an 8×4 block; an adder 82 adding the 8×4 downsampled data to a motion compensated data; a classifier 83 classifying and separating the data from the adder 82 into I, P and B pictures; a first format converting unit 84 converting the B picture of the 8×4 data from the classifier 83 into a final screen display format, 4:2:2 in which more vertical color signal information is included than horizontal color signal information, the data having a size of 720 pels/480 lines; a first and second data encoding unit 85a and 85b encoding the I and P pictures from the classifier 83 and the B picture from the first format conversion unit 84 respectively; a memory 86 including an anchor frame memory 86a storing the I, P picture information encoded by the first and second data encoding units 85a and 85b, and a B frame memory 86b storing the B picture information.

The decoder in FIG. 11 further includes a first data decoding unit 87 decoding the data stored in the anchor frame memory 86a; a horizontal upsampling unit 88 horizontally upsampling the information decoded by the first data decoding unit 87 to convert into a 8×8 size; a motion compensated predictor 89 receiving an output of the horizontal upsampling unit 88 and performing both motion compensation and prediction using the motion vector information; a horizontal downsampling unit 90 horizontally downsampling and forwarding the output of the motion compensation predictor 89 into an 8×4 size to the adder 82; a second data decoding unit 91 decoding the data stored in the B frame memory 86b to provide B frame information; a third data decoding unit 92 decoding the data stored in the anchor frame memory 86a; and a second format conversion unit 93 converting a format output from the third data decoding unit 92 into a final screen display format of size 720 pels/360 lines identical to the first format conversion unit 84.

The operation of the decoder for a digital TV receiver in accordance with a fourth embodiment of the present invention will be explained. The IDCT/downsampling unit 81 receives DCT coefficients in an 8×8 size input data (inclusive of I, P and B pictures). The IDCT/downsampling unit 81 inverse discrete cosine transforms and horizontally downsamples the received coefficients to reduce from the 8×8 size to an 8×4 size (960 pels/1080 lines), and forwards the data to the adder 82. The adder 82 adds the 8×4 data and the motion compensation information, and the classifier 83 separates the B picture from the I and P pictures in the 8×4 data. The first format converting unit 84 converts the B picture of a size 960 pels/1088 lines into a 4:2:2 format of a size of 720 pels/480 lines. This format is used for displaying an image of 16:9 aspect ratio on a screen with 4:3 aspect ratio, called the letter-box type display.

Once the format conversion is completed, color signal components may occupy regions of the memory corresponding to remaining regions of the 16:9 letter box. Thus, an adequate amount of the color signal components which almost does not require downsampling can be retained, assuring an improved picture quality on a color signal in a displayed image.

Particularly, the B picture of the 8×4 format is converted into the 4:2:2 format at the first format conversion unit 84. The bits of the B picture is reduced at the second data encoding unit 85b before storing the B picture in the B frame memory 86b. The bits of the I and P frames classified at the classifier 83 are also reduced through the first data encoding unit 85a and stored in the anchor frame memory 86a. The bit deduction or reduction at the first and second encoding units 85a and 85b may be carried out in the same manner as explained with reference to FIG. 6.

Thereafter, the data from the anchor frame memory 86a is decoded at the first data decoding unit 87, and the decoded 8×4 data is horizontally upsampled at the horizontal upsampling unit 88 which receives motion vectors for motion compensation. The 8×8 data horizontally upsampled at the horizontal upsampling unit 88 is output to the motion compensated predictor 89 to be motion compensated by the motion compensation vectors. Having a size of 8×8, the compensated data is forwarded to the horizontal downsampling unit 90 and horizontally downsampled into 8×4 before being forwarded to the adder 82, thereby providing motion compensated I, P and B picture signals in conformity with the I, P and B picture data(sizes) downsampled by the IDCT/downsampling unit 81.

By repeating the above procedures, the I, P and B frame data are processed. The B picture data from the B frame memory 86 is decoded by the second data decoding unit 91, and the I and P picture data from the anchor frame memory 86a are decoded at the third data decoding unit 92. The 8×4 data decoded at the third data decoding unit 92 is converted into the 4:2:2 format of the size of 720 pels/480 lines through the second format conversion unit 93 to be displayed on the screen with the B frame.

Therefore, without any final display size conversion, namely the 1:2 chroma upsampling unit, the decoded value at the second decoding unit 91 which decodes an output of the B frame memory 86b and I and P picture values after format conversion can be directly presented in conformity with the screen format, i.e. the 4:2:2.

Fifth Embodiment

Figure 12:
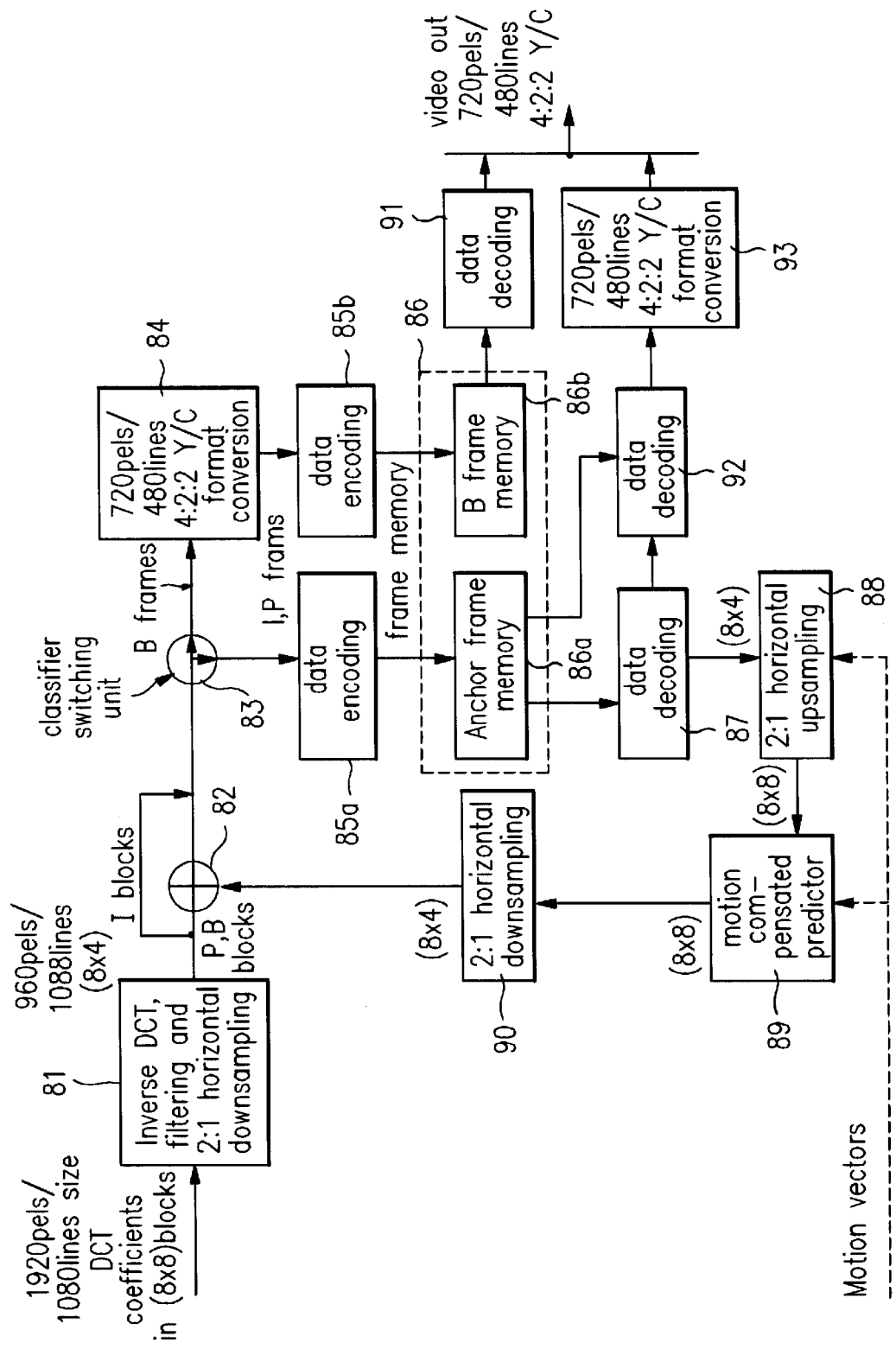
FIG. 12 is a block diagram of a decoder for a digital TV receiver according to a fifth embodiment of the present invention.

FIG. 12 is a block diagram of a decoder for a digital TV receiver according to a fifth embodiment of the present invention. The fifth embodiment includes the same components as the fourth embodiment described with reference to FIG. 11. However, in the fifth embodiment, each of the first and second format conversion units 84 and 93 has a 4:2:2 format with 720 pels/480 lines. Although the fifth embodiment requires a little more memory space as compared to the fourth embodiment, the fifth embodiment decoder can store color signals almost as they are for cases where a 16:9 image is displayed on 16:9 wide TV or displayed in a pan and scan type on a 4:3 TV.

FIGS. 13A and 13B show tables comparing the fourth, and fifth embodiments and the related arts. As shown in the tables, though the fourth and fifth embodiments of the present invention require a little more memory in comparison to the related art, the decoder of either the fourth or fifth embodiment facilitates reproduction of a high quality color signal because the decoder can hold more color signals (Cb and Cr) compared to the related art decoder.

Summary

As explained above, the decoder for a digital TV receiver according to the present invention has the following advantages.

First, the present decoder makes a format conversion which allows a SDTV receiver of MEPG2 to receive and process a HD class image while including relatively more vertical information than horizontal information, thereby reproducing a high quality color signal.

Second, the format conversion into a 4:2:2 format and the storage of the converted 4:2:2 format is facilitated by the decoder of the present invention. Because an adequate amount of color information in the vertical information is retained, the present invention may require slightly more memory space. However, the reception and processing of a HD class image by a SDTV receiver is significantly improved to allow a reproduction of a high quality color signal.

Third, the necessary circuit may be simplified due to an elimination of an upsampling unit required at the end of the decoder in the related art.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A decoder for a digital TV comprising:
   a first downsampling unit downsampling original luminance information of the received data into a data block of a 4×4 size, and downsampling original color information of the received data into a data block of a 8×4 size, the original color information including original horizontal and vertical color signal information;
   a storage unit storing the downsampled luminance and color information;
   a motion compensation unit motion compensating the downsampled luminance and color information utilizing input motion vectors;
   an adder combining the sampled luminance information and the downsampled color information to the motion compensated data, wherein the storage unit stores the combined data and outputs the combined data as a sampled data; and a conversion unit converting a received format of the sampled data block into a 4:2:2 format, wherein the resultant format includes relatively more of the original vertical color signal information than the original horizontal color signal information.

2. A decoder for a digital television receiver, comprising:

a processing unit receiving data blocks having original horizontal and vertical color signal information and downsampling the received data blocks to smaller sized processed data blocks; and a conversion unit converting a format of the processed data blocks into a resultant format having a lower resolution such that the resultant format includes relatively more of the original vertical color signal information than the original horizontal color signal information.

3. A decoder of claim 2, wherein the processing unit comprises:

a first downsampler downsampling received luminance data blocks to a first predetermined size and downsampling received color data blocks to a second predetermined size; and a motion compensation processing structure motion compensating the downsampled luminance and color data blocks based on input motion vectors.

4. A decoder of claim 3, wherein the motion compensation processing structure comprises:

a frame memory storing the downsampled luminance and color data blocks;

an upsampling unit upsampling the stored luminance and color data blocks to a same size as the received data blocks;

a motion compensator motion compensating the upsampled luminance and color data blocks based on the input motion vectors;

a second downsampling unit downsampling the motion compensated luminance and color data blocks; and a combiner combining the downsampled luminance and color data blocks with the downsampled motion compensated luminance and color data blocks.

5. A decoder of claim 3, wherein the first downsampling unit vertically and horizontally downsamples the luminance information into a data block of the first predetermined size, and horizontally downsamples the color information into a data block of the second predetermined size.

6. A decoder of claim 5, wherein the first predetermined size is 4×4 and the second predetermined size is 8×4.

7. A decoder of claim 3, wherein the conversion unit converts the format of the processed data blocks into a resultant format of 4:2:2.

8. A decoder of claim 3, wherein the conversion unit converts the format of the processed data blocks into a resultant format with a size of either 720 pels/480 lines or 720 pels/360 lines.

* * * * *